United States Patent [19]

Beard

[11] Patent Number: 4,596,008

[45] Date of Patent: Jun. 17, 1986

[54] OPTICAL SOUND TRACK PLAYBACK APPARATUS AND METHOD

[76] Inventor: Terry D. Beard, 1407 Northview Dr., Westlake Village, Calif. 91361

[21] Appl. No.: 526,433

[22] Filed: Aug. 25, 1983

[51] Int. Cl.$^4$ .............................................. G11B 7/125
[52] U.S. Cl. .................................. 369/107; 369/104; 369/116; 369/117; 369/118
[58] Field of Search ............... 369/104, 105, 106, 107, 369/100, 111, 116, 117, 118, 54, 58, 125, 50; 250/204, 578

[56] References Cited

U.S. PATENT DOCUMENTS

| | | | |
|---|---|---|---|
| 1,946,404 | 2/1934 | Konemann | 369/116 |
| 2,347,084 | 9/1942 | Cooney | 179/100.3 |
| 2,485,829 | 10/1949 | Holst et al. | 179/100.3 |
| 2,575,445 | 9/1949 | Germer | 179/100.3 |
| 3,513,268 | 5/1970 | John | 369/107 |
| 4,124,784 | 11/1978 | Johnson et al. | 179/100.3 R |
| 4,184,055 | 1/1980 | Dolby | 179/100.3 R |
| 4,223,188 | 9/1980 | Dolby | 179/100.3 R |
| 4,235,531 | 11/1980 | McCormick | 369/107 |
| 4,355,383 | 10/1982 | Dolby | 369/120 |

*Primary Examiner*—Alan Faber
*Attorney, Agent, or Firm*—Koppel & Harris

[57] ABSTRACT

The locally averaged or approximate D.C. value of a variable area optical sound track on a film is first determined, and this information is then used to control the width of a scanning slit at a playback station. The scanning slit width is reduced for small signals and increased for large signals, thereby reducing the amount of non-information bearing area on the film which is included in the scanned area. This in turn reduces the amount of noise from dirt and debris in the non-information bearing area, and by reducing the total amount of light transmitted through the film also lowers the level of quantum noise from the photodetector employed at the playback station.

17 Claims, 7 Drawing Figures

OPTICAL SOUND TRACK PLAYBACK APPARATUS AND METHOD

BACKGROUND OF THE INVENTION

1. Field of the Invention

This invention relates to sound recording for motion pictures, and more particularly to apparatus and a method for reducing noise during the playback of optical sound tracks.

2. Description of the Prior Art

Variable area motion picture sound tracks are made by recording a negative sound track on special high-contrast recording film, which is then used to make a contact print of the motion picture print to be released. The amount of open area in the finished print sound track is kept as small as possible, but the open area must still be large enough to record the full range of the sound track. Thus, when the maximum sound volume being recorded is at a low level, the open sound track area is small, but the open area increases as the maximum sound level increases to accommodate the increased level.

A primary source of noise in optical sound tracks is dirt and other debris in this open area. As the open areas of the sound track increase, more noise is generated as a result of the dirt and debris. This problem is particularly severe when optical sound tract negatives are played. With negatives, the open area on the sound track is greatest when the sound signals are at a minimum; since low level signals are not nearly as effective as high level signals in masking noise, the greater area available for noise and debris can be compounded by the low signal level to product unacceptably noisy sound. In some cases it would be desirable to playback a negative directly, but because of the noise problem an expensive positive print must be made from the negative and the print played back. Even then, the imprint of dirt and debris on the negative may be transferred onto the positive.

Additional noise in playing back an optical sound track originates as quantum noise from the photocell which is used to detect light transmitted through the film. This noise increases in intensity with the amount of light striking the photocell. Since a greater amount of light strikes the photocell during the low signal portions of a sound track negative, this type of noise is then an additional limitation on the ability to directly play back a sound track negative.

SUMMARY OF THE INVENTION

In view of the above problems associated with the prior art, an object of the present invention is the provision of a novel apparatus and method for playing back optical sound tracks while reducing the amount of noise due to dirt and debris on the sound track and to light striking the photocell detector.

Another object of the present invention is the provision of a novel apparatus and method for controlling the width of the sound track which is scanned, so that the scanned area is limited primarily to the information bearing portion of the sound track region, and most non-information bearing areas which can contribute to noise are excluded.

These and other objects of the invention are accomplished by a playback system in which the width of the film which is scanned to read the sound track is dynamically controlled in accordance with the amplitude of the sound track signal in the area being scanned. A pre-scanning station located prior to the primary scanning station monitors the sound track and determines its locally averaged, or D.C., level as the film advances. This information is transmitted to the primary scanning station, where it is used to continuously modulate the width of the scanning area on the film. The width of the scanning area is reduced as the level of the sound track decreases, thereby reducing the amount of area external to the sound track which is scanned. This in turn reduces the amount of dirt and debris that is available to interfere with the scanning process, and also reduces the amount of light reaching the detector photocell and the resulting level of quantum noise.

The approximate D.C. level of the sound track signal is obtained by processing the pre-scanning signal through a filter circuit which removes the audio frequency components. The filter circuit has a predetermined signal delay time, and the scanning and pre-scanning stations are separated by a distance equal to the filter delay time multiplied by the film speed, whereby the modulation of the scanning width is controlled in synchronism with the sound track passing by the primary scanning station.

These and other features and advantages of the invention will be apparent to those skilled in the art from the ensuing detailed description, together with the accompanying drawings, in which:

DESCRIPTION OF THE DRAWINGS

FIG. 7 is a detailed schematic diagram of the photocell, filter and control circuits referred to FIG. 5.

DETAILED DESCRIPTION OF THE PREFERRED EMBODIMENT

Figure 1:
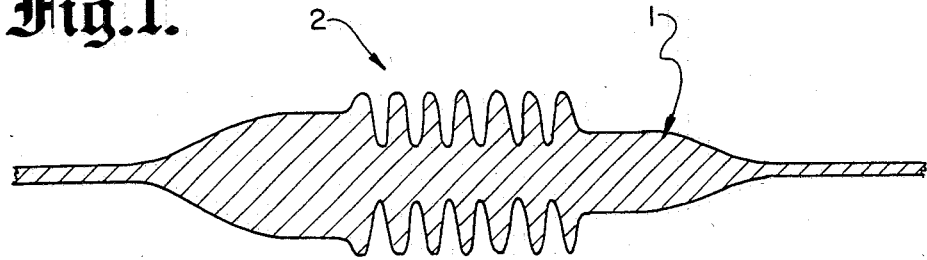
FIG. 1. is an enlarged and simplified plan view of a portion of an optical sound track negative.

FIG. 1 shows an enlarged view of a section of an optical sound track negative. The exposed sound track area 1 of the film is essentially opaque; the unexposed area 2 of the film is essentially clear and transparent. The sound track consists of A.C. sound signals superimposed on a D.C. signal. The magnitude of the D.C. signal is allowed to vary only at a subaudible rate so that it produces no audible output upon playback. While a somewhat regular signal pattern is illustrated in FIG. 1 for the sake of simplicity, the sound track signal would normally exhibit a considerable variation.

Figure 2:
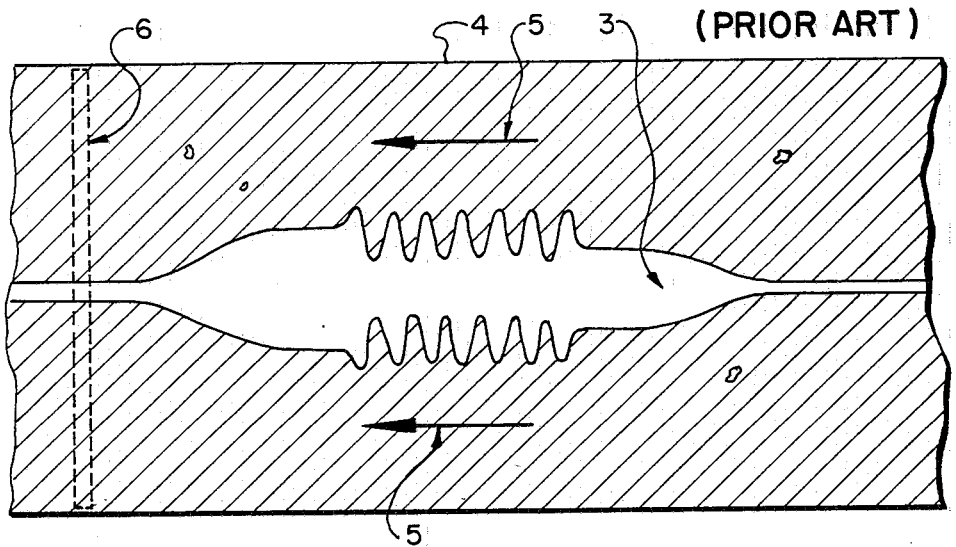
FIG. 2 is an enlarged and simplified plan view illustrating a prior art technique of playing back an optical sound track on a positive film print.

FIG. 2 is an enlarged view of a portion of a positive film print displaying an optical sound track which has been printed from the negative track shown in FIG. 1. In the positive print of FIG. 2 the modulated signal area 3 is clear, while the surrounding area on the film 4 is opaque. According to the conventional technique for reading or playing back the print sound track 3, the film is moved in the direction shown by arrows 5 past a scanning slit 6 though which light passes. The amount of light passing through the film is modulated by the width of the open sound track area 3. This modulation is detected by a photo detector, amplified and converted back into sound by an audio transducer.

Figure 3:
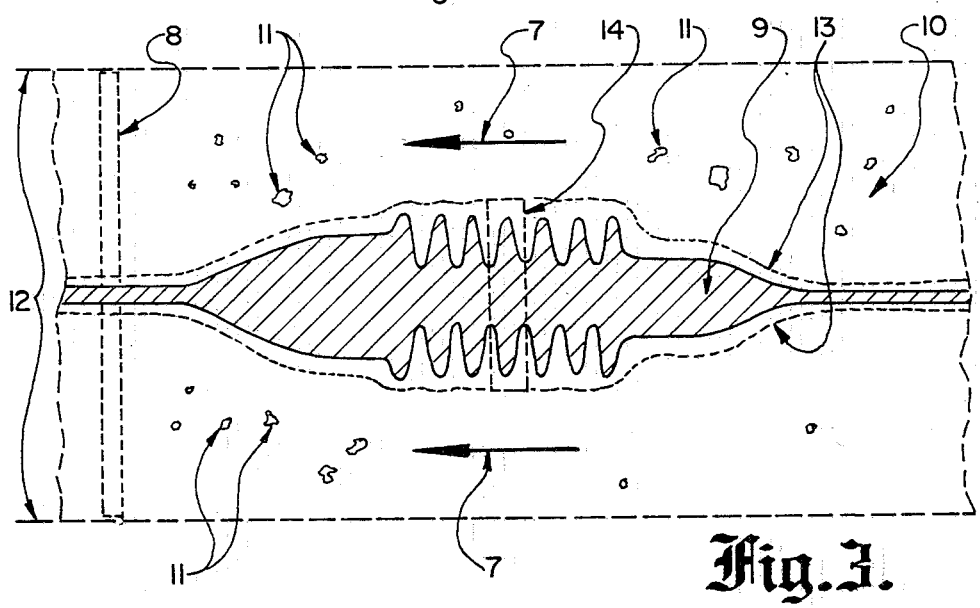
FIG. 3 is an enlarged and simplified plan view of a portion of a film negative, illustrating the play back method of the present invention.

Referring now to FIG. 3, the sound track portion of a film negative is shown being played back in the conventional manner illustrated in FIG. 3. The film is moved in the direction shown by arrows 7, past a scanning slit 8. The width of slit 8 is fixed, and is selected such that it will always be greater than the width of the sound track, to avoid the possibility of clipping any of the sound track signals. The opaque area 9 of the sound track modulates the amount of light passing through the film. However, this light also passes through a large amount of open area 10 on the sound track section. This open area typically includes particles of dirt and debris 11 which cause noise in the recovered signal. The boundary of the area scanned by this prior art technique is shown by dotted lines 12; the area of open film within these boundaries may be considerably greater than the opaque sound track area, resulting in a relatively large amount of noise from dirt and debris which is not located within the information bearing portion of the sound track.

The present invention greatly reduces this noise by scanning only the information-containing portion of the sound track, plus a little bit more to assure that none of the modulated signal has been clipped. The portion of the sound track scanned in accordance with the present invention is enclosed within illustrative dashed lines 13. These lines form an envelope, the width of which varies along the sound track in accordance with the peak values of the sound track so that it includes all of the modulated signal but not much more. The majority of the open film area which previously contributed to the noise level is entirely excluded from the optical scanning, thus greatly reducing the amount of noise which is picked up. The width of the envelope at any location along the sound track varies in positive proportion with the approximately D.C. level of the sound track. The scanning slit at any given moment extends across the envelope but no farther, as illustrated by the dashed line slit 14.

Figure 4:
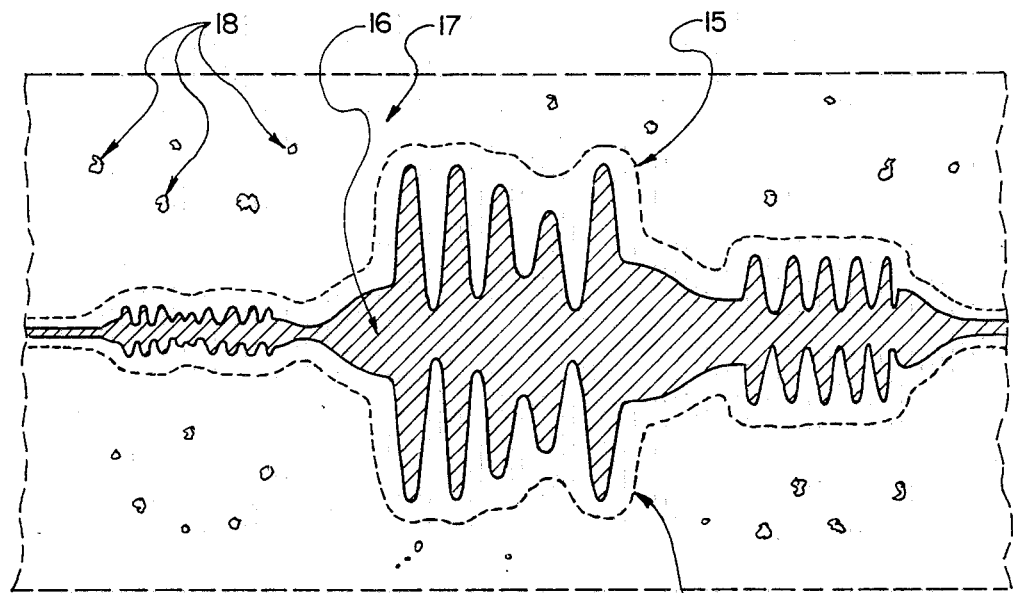
FIG. 4 is an enlarged and simplified plan view of a portion of another optical sound track negative, illustrating the scanning pattern of the present invention.

FIG. 4 illustrates how the width of the scanned area 15 changes in response to the exposed modulated area 16 of a film sound track. Most of the clear area 17 of the track and its accompanying dirt and debris 18 is thus eliminated from the scanning. It should be noted that the area scanned in accordance with the present invention should be changed relatively slowly, so that the change does not cause an audible affect. This means that changes should occur at a subaudible rate, over a transition period of at least several milliseconds.

Figure 5:
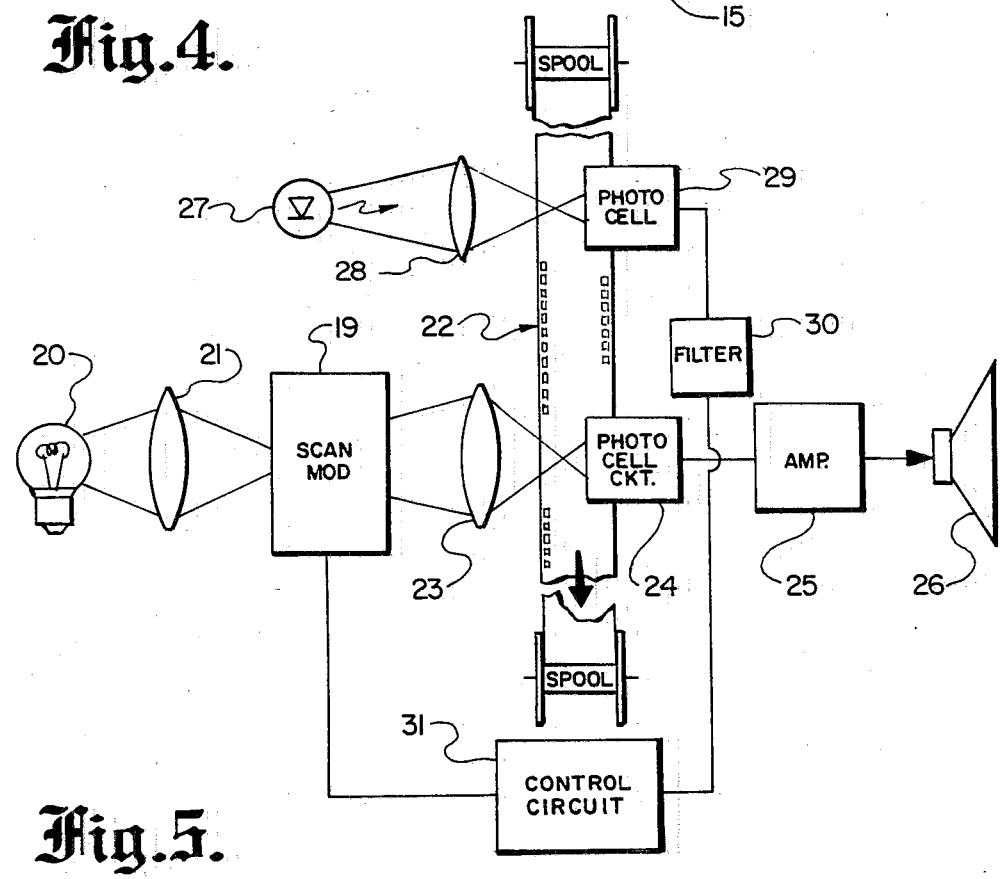
FIG. 5 is a block diagram of apparatus which may be employed in carrying out the invention.

One embodiment of the present invention is shown in block diagram form in FIG. 5. A light valve 19 is used to project a varying scanning slit onto the film optical sound track at a primary scanning station. In this embodiment light from an incandescent source 20 passes through condensing optics 21 to the light modulator of valve 19. The light valve may be of the type sold by the Westrex division of Litton Systems, Inc., or an RCA galvonometer, a charged coupled device (CCD) scanner, or cathode ray tube may be also used as the scanning slit width modulator. The light from light valve 19 is imaged as a slit onto the film 22 by means of another set of standard optics 23. A photocell light detector circuit 24 detects the light passed through the sound track and generates a corresponding electrical sound signal for delivery to an amplifier 25, which drives speaker 26.

A second scanning station is spaced from the first station, and employs another light source, such as an infrared light emitting diode (LED) 27. Light from source 27 is imaged by optics 28 and directed onto a fixed width portion of the film 22 which includes the sound track. This light is transmitted through the open portion of the film to a light detecting photocell circuit 29 which produces a signal indicative of the amount of received light; the signal accordingly provides an indication of the width of the opaque sound track at the location on the film which at the moment is passing by the second scanning station. The output of photocell circuit 29 is delivered to a low pass filter circuit 30 which removes the audible A.C. components of the signal, thus deriving the locally averaged or approximate D.C. value of the portion of the sound track at the second scanning station.

The D.C. output of filter 30 is delivered to a control circuit 31, the output of which in turn is connected to control scanning modulator 19. For a film negative in which the sound track is opaque, control circuit 31 is designed to reduce the scanning modulator slit as more light is detected by photocell 29 in response to a lower sound track signal level, and conversely to increase the size of the slit as less light is detected in response to a greater sound track signal level. When the sound track on a positive print is being played back, control circuit 31 is designed to function in the opposite manner, increasing the width of the scanning slit as more light is detected by photocell 29 and decreasing the slit width as less light is detected. In either case, the result is to limit the area of the film being scanned to only slightly more than the information bearing portion of the sound track as the film is advanced between a paid or playout and takeup spools.

Figure 6:
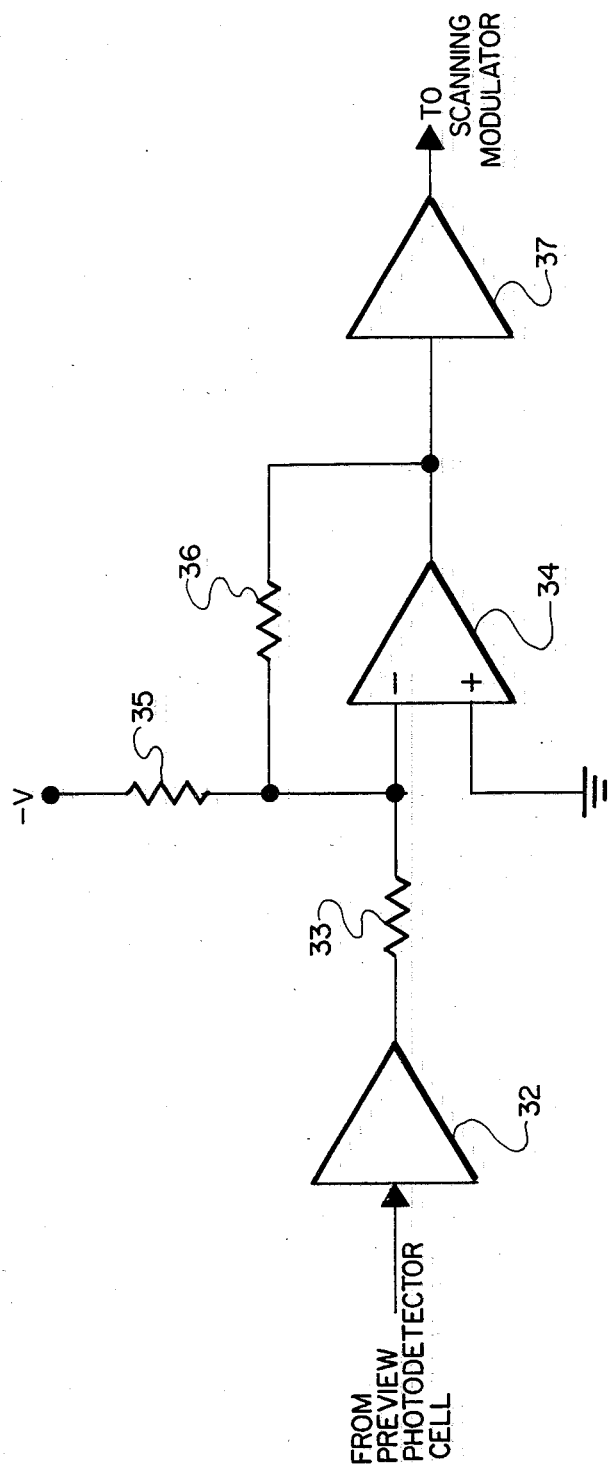
FIG. 6 is a simplied schematic diagram of the filter and control circuits referred to in FIG. 5.
Figure 2:
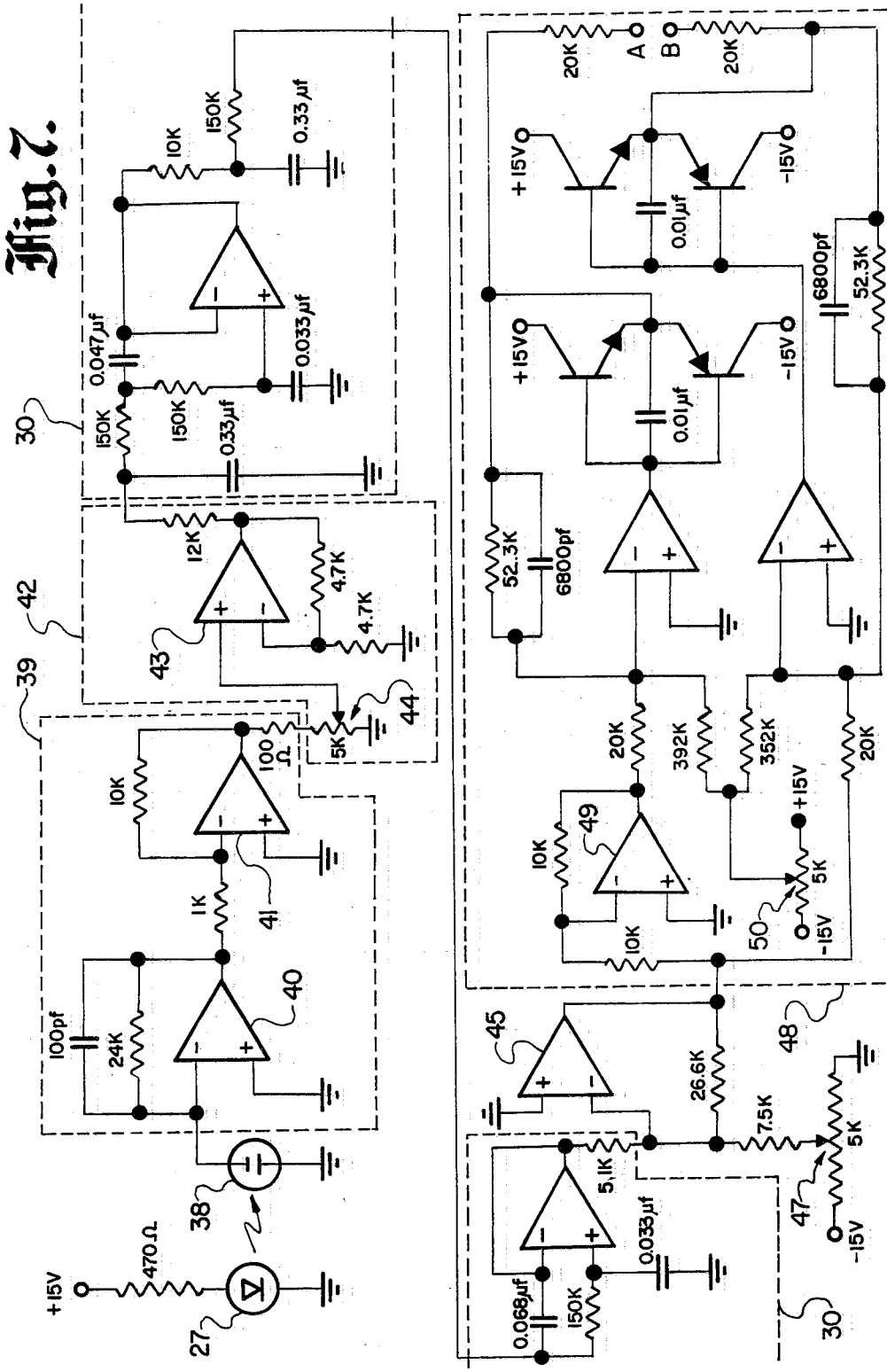

Turning now to FIG. 6, the filter circuit 30 and control circuit 31 are shown in somewhat more detail. The filter comprises a low pass amplifier 32 which removes all audio frequency components from the signal produced by photocell circuit 29. For example, amplifier 32 can be a 6–8 pole low pass filter with a 15 Hz cutoff frequency. The output of amplifier 32 is transmitted through a resister 33 to the inverting input of an operational amplifier 34. The inverting amplifier input is also connected to a negative voltage potential through resistor 35, and in a negative feedback circuit with the amplifier output through resister 36. The positive input to amplifier 34 is grounded. The output of operational amplifier 34 is connected to the input of a drive amplifier 37 which drives the light modulator so that the width of the scanned area decreases as the input to amplifier 37 decreases.

The output of amplifier 32 moves in the positive direction when the amount of light falling on photocell 29 increases, causing the output of amplifier 34 to decrease as the detected light increases. Resistor 36 sets the gain of amplifier 34, while the negative voltage level and the values of resistors 33, 35 and 36 are selected so that with a fully modulated track the scanned area opens to scan the full track area, and with a minimum or no modulation track the scanned area is just larger than the narrow exposed area of the track.

The second or pre-scanning station shown in FIG. 5, consisting of LED 27, optics 28 and photocell circuit 29, must be positioned in advance of the primary scanning station along the film path by a predetermined distance such that a given location on the sound track is scanned at the primary scanning station at the same time as the control signal corresponding to that location is applied to the scanning modulator 19. Because of the presence of low pass filter 30, approximately 50 milliseconds are required for the system electronics to respond to a change in the modulated area of the sound track. The two photocells 24 and 29 should accordingly be spaced apart by the distance travelled by the film in 50 milliseconds.

Referring now to FIG. 7, a schematic diagram of the photocell, filter and control circuit of FIG. 5 is shown. Many of the circuit elements shown in FIG. 7 are selfexplanatory, and the discussion herein will be concerned mostly with an explanation of the function of those elements. LED 27 directs light in a fixed slit pattern onto the film (not shown) and the light transmitted through the clear areas on the film is received by a photocell 38. The output of the photocell is processed through a pre-amplifier circuit shown enclosed in dashed lines 39 and comprising operational amplifiers 40 and 41 and associated negative feedback circuitry. The output of the pre-amplifier is delivered to a variable gain amplifier circuit shown in dashed lines 42 and consisting of an operational amplifier 43, the non-inverting input of which is connected to the variable tap of a potentiometer 44 to adjust the amplifier gain, and the inverting input of which is connected in a feedback circuit.

The output of the variable gain amplifier 42 is connected to low pass filter 30, shown enclosed in dashed lines. The filter depicted in FIG. 7 is a six pole 19 Hz low pass filter. The filter output is connected to the inverting input of a summing amplifier 45. The same input is connected to a potentiometer 47 which is biased and interconnected to provide an adjustable D.C. offset to the drive signal delivered to the scanning modulator 19 in the primary scanning station. The setting of potentiometer 47 determines the width of the envelope 13 illustrated in FIG. 3 when no audio signal is present. The potentiometer setting can be adjusted to either increase or reduce the amount of clear film area which is scanned by modulator 19. A greater scanning area may be desirable for sound tracks whose position varies to prevent the possibility of distorting or clipping the track, while in general a smaller scanning area is desirable to reduce noise.

The output of summing amplifier 45 is connected to a drive amplifier for the scanning modulator, shown in dashed lines 48. The drive amplifier includes a unity gain inverter 49 which inverts the incoming signal before delivering it to the remainder of the drive amplifier circuit, which forms a push-pull amplifier having an output at terminal A of equal magnitude but opposite polarity to the output at terminal B. Terminals A and B are connected as inputs to the scanning modulator 19 to control the instantaneous scanning width at the primary station. The drive amplifier circuit also includes a potentiometer 50 which is connected to the push-pull amplifier so as to shift the light from scanning modulator 19 relative to the film. This enables the system to be adjusted for changes in sound track position from film to film. This circuit is designed to drive a Westrex-type light valve as the scanning device. For this application the modulating ribbons within the light valve are driven independently with one end of one ribbon connected to terminal A and the other end to ground, and one end of the other ribbon connected to terminal B and its other end to ground.

In operation, a film is advanced through the two scanning stations. The pre-scanning station monitors the width of the sound track by illuminating the film with a slit of fixed width and monitoring the amount of light which is passed through the film. The received light is converted to an electrical signal and filtered by low pass filter 30 to obtain its locally averaged or approximate D.C. value. This information is applied to the control circuit 31, which controls scanning modulator 19 to increase the scanning width at the primary scanning station when the width of the sound track signal increases, and to correspondingly decrease the scanning width when the width of the sound track signal decreases. The two scanning stations are separated from each other by a distance such that, by the time the sound track width signal from the pre-scanning station has reached scanning modulator 19, the portion of the film from which the width signal was obtained has reached the primary scanning station. The sound track is then read at that station and a sound signal is produced which has been subjected to only a relatively small amount of noise from the relatively small amount of open film area which was included in the scanning view. The reduction in the amount of film area scanned also reduces the total amount of light reaching the photocell at the primary station, and thus reduces the level of quantum noise from that source.

While a preferred embodiment of the invention has been shown and described, it should be understood that numerous variations and modifications will occur to those skilled in the art. For example, the effective width of the slit of light applied to the film at the primary scanning station may be controlled either by adjusting the system optics and the width of the beam directed at the film, or by keeping the optics constant and varying the size of a physical slit positioned over the film. In the case of a CCD scanner, the scanned area may in effect be varied by electronically sensing only that part of the photodetector which corresponds to the desired scanned area; this is equivalent to using a variable scanner with a constant area photodetector. By storing the output of the CCD elements in a memory in digital form and subsequently determining the average modulated track width from this data, the determination of the required scanned area can be made and extracted from the memory data without the need for preview scanning. Also, control mechanisms for achieving a scanning envelope around the sound track other than the filter circuit described herein may be envisioned. Accordingly, it is intended that the invention be limited only in terms of the appended claims.

I claim:
1. A method of reading a variable width optical sound track which is displayed on a film, comprising the steps of:
   determining the locally averaged width of the sound track along the length of the film,
   scanning a portion of the film which includes the sound track,
   controlling the scanning in response to the locally averaged sound track width so that the width of the film which is scanned at any location along the film varies in positive proportion to the locally averaged sound track width at that location and substantially excludes the film outside the locally averaged width from the scanning, detecting light transmitted through the film by said scanning, and generating a sound signal which varies in accordance with the amount of detected light.

2. The method of claim 1, wherein the locally averaged sound track width is determined by sensing the approximate D.C. level of the sound track.

3. The method of claim 1, wherein the step of determining the locally averaged width of the sound track along the length of the film includes the steps of optically pre-scanning the film along a fixed portion of its width in synchronism with and in advance of the optical scanning step, said fixed portion including the sound track, detecting light transmitted through the film by said pre-scanning, and deriving the approximate D.C. level of the detected light as an indication of the locally averaged sound track width.

4. The method of claim 3, wherein the approximate D.C. level of the light detected from the pre-scanning step is derived by generating a variable electrical signal which corresponds to the amount of detected pre-scanning light, and processing the electrical signal through a filter circuit to remove its audible A.C. components.

5. The method of claim 4, said filter circuit introducing a predetermined delay to the electrical signal, wherein the film is scanned and pre-scanned at predetermined stations, and the film is moved between said stations at a speed such that the time necessary for the film to move from the pre-scanning to the scanning station is substantially equal to the filter delay time.

6. The method of claim 3, wherein the width of the film which is pre-scanned is at least as great as the maximum width of the film which is scanned.

7. The method of claim 1, wherein the scanning is controlled so that the width of the film scanned at any location along the film exceeds the locally averaged width of the sound track at that location by a predetermined amount.

8. A method of reading a variable width optical sound track which is displayed on a film, comprising the steps of:

establishing an envelope for the sound track, the width of the envelope varying generally with the sound track's peak values along the sound track, optically scanning the portion of the film which is included within the envelope, varying the width of optical scanning to substantially exclude the film outside the envelope from the scanning, detecting light transmitted through the film by said scanning, and generating a sound signal which varies in accordance with the amount of detected light.

9. The method of claim 8, wherein the sound track envelope is established by optically pre-scanning the film along a fixed portion of its width which includes the sound track, detecting light transmitted through the film by said pre-scanning, deriving the approximate D.C. level of the detected light, and establishing the envelope as a function of said approximately D.C. level.

10. The method of claim 9, wherein the maximum envelope width is less than the width of the film which is pre-scanned.

11. In an apparatus for reading a variable width optical sound track displayed on a film, and including means for advancing the film at a predetermined speed, the improvement comprising:

means for optically scanning the film across a controllable portion of its width, means for detecting light transmitted through the film by the scanning means, means for determining the approximate D.C. value of the sound track, control means responsive to the D.C. value determining means and connected top the scanning means for controlling the width of the film scanned by the scanning means such that the scanning width at different locations along the film varies in positive proportion to the approximate D.C. value of the sound track at such locations, including substantially the entire sound track width and substantially excluding the film outside the sound track from the scanning width at such locations, and means responsive to the light detecting means for generating a sound signal which varies in accordance with the amount of detected light.

12. The apparatus of claim 11, said means for determining the approximate D.C. value of the sound track comprising means for optically pre-scanning the film along a fixed portion of its width which is at least as great as the maximum width of the film which is scanned, means for detecting light transmitted through the film by the pre-scanning means, means for generating a variable electrical signal which corresponds to the amount of detected pre-scanning light, and a filter circuit for substantially removing the audible A.C. components of said electrical signal.

13. The apparatus of claim 12, said filter circuit having a predetermined signal delay time, wherein said pre-scanning means is positioned to pre-scan the film in advance of the scanning means by a distance which is substantially equal to the signal delay time between the scanning and pre-scanning means multiplied by the film speed.

14. The apparatus of claim 13, said control means comprising a control circuit which is connected to receive the output of the filter circuit and to produce an output control signal for delivery to the scanning means, said control circuit including means to adjust the magnitude of the output control signal for a given input from the filter circuit, and thereby adjust the film width which is scanned.

15. Apparatus for reading a variable width optical sound track which is displayed on a film as the film is advanced at a predetermined speed, comprising:

(a) a first scanning station, comprising:
 (1) a first light source
 (2) means for directing light from the first light source onto a portion of the film which includes the sound track,
 (3) means for controlling the width of the light which is directed onto the film, and
 (4) means for detecting light from the first light source which is transmitted through the film and for producing an electrical output signal which corresponds to the amount of detected light, and thereby to the optical sound track, (b) means responsive to the first light detecting means for generating a sound signal which varies in accordance with the amount of detected light, (c) a second scanning station, comprising:
 (1) a second light source, (2) means for directing light from the second light source onto a portion of the film which includes the sound track, the width of said portion being fixed, and (3) means for detecting light from the second light source which is transmitted through the film and for producing an electrical output signal which corresponds to the amount of detected light, (d) a filter circuit connected to substantially remove the audible A.C. components of the second scanning station output signal and to produce an output signal which varies in accordance with the approximate D.C. value of the sound track, said filter circuit being characterized by a predetermined delay time, and (e) a control circuit which is connected to receive the output of the filter circuit and in response thereto to produce a control signal for the light directing means of the first scanning station such that the width of the film which is scanned at that station varies in accordance with the approximate D.C. value of the sound track, (f) said second scanning station being positioned in advance of the first scanning station along the film path by a distance which is substantially equal to the filter circuit delay time multiplied by the film speed.

16. The apparatus of claim 15, wherein the width of the film which is scanned at the first station is controlled by the control circuit to be no greater than the fixed scanning width at the second station.

17. The apparatus of claim 16, said control circuit including means to adjust the magnitude of the output control signal relative to the input signal from the filter circuit, and thereby adjust the amount of film external to the sound track which is scanned at the first station.

* * * * *